Patented Mar. 12, 1940

2,192,906

UNITED STATES PATENT OFFICE 2,192,906

DIAMIDES OF ALIPHATIC SULPHO- AND SULPHATO-DICARBOXYLIC ACIDS AND PROCESSES OF PREPARING THEM

William Edward Hanford and Clyde Overbeck Henke, Wilmington, Del., assignors to E. I. du Pont de Nemours & Company, Wilmington, Del., a corporation of Delaware No Drawing. Application September 17, 1937, Serial No. 164,336

11 Claims. (Cl. 260—458)

This invention relates to new chemical compounds, their methods of preparation, and their technical uses. More particularly this invention relates to the manufacture and utilization of new surface active diamides of aliphatic sulpho- and sulphato-dicarboxylic acids. More specifically it covers the manufacture of diamides of aliphatic sulpho- and sulphato-dicarboxylic acids in which the amide groups are derived from primary or secondary aliphatic amines containing from 4 to 11 carbon atoms.

This invention has as an object the preparation of new chemical compounds which have surface active properties. A further object is to manufacture these new compounds by novel and easily conducted processes which give high yields of products of high quality. A still further object is to use these new compounds in a number of relations in which surface active compounds are commonly employed. Other objects will appear hereinafter.

These objects are accomplished by the following invention which relates to the manufacture of new compounds which have the general formula, $X-R(CONR'R'')_2$, in which X represents a sulphonate or sulphate group, R stands for an aliphatic radical, R' denotes hydrogen or a short chain aliphatic radical, and R'' is an open chain aliphatic radical, the sum of the number of carbon atoms in R' and R'' being at least 4 and not more than 11.

The invention is illustrated but not limited by the following examples, in which the parts are by weight.

EXAMPLE 1

*Sodium bis(N-methyl,N-2-ethylhexyl) sulphosuccinamide*

9.2 parts of bis(N-methyl,N-2-ethylhexyl) fumaramide, 2.8 parts of sodium bisulphite, 50 parts of water and 39 parts of denatured ethyl alcohol were placed in a Monel metal bomb and heated and rotated at 100–105° C. for 20 hours. The bomb was then opened, and the contents were found to be completely miscible. The alcohol and water were distilled off. The residue resembled a viscous soap solution. It was dried over phosphorus pentoxide in a vacuum dessicator and 13 parts of a waxy, light brown solid was obtained. Aqueous solutions of this material foamed strongly when shaken with air and were found to be efficient wetting agents for wetting cotton textiles. The probable formula of this new compound is:

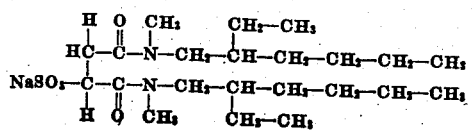

EXAMPLE 2

*Sodium bis(N-octyl) sulphosuccinamide*

8.5 parts of bis(N-n-octyl) fumaramide, 2.8 parts of sodium bisulphite, 50 parts of water, and 78 parts of denatured alcohol were heated in a nickel shaker bomb at 100–105° C. for 24 hours. On cooling to about 40° C., the reaction mixture became partially paste and partially liquid. 63 parts of this reaction mixture, 31 parts of denatured alcohol, 3 parts of sodium bisulphite and 25 parts of water were heated at 150° C. for 8 hours. The bomb was then opened, and the reaction mixture was found to be homogeneous and soluble in water. Aqueous solutions foamed when shaken with air. This sulphosuccinamide when warmed with water dissolves completely but, on cooling, sets to a thick gel at a concentration of about 0.55%. Warm aqueous solutions of this material wet sulphur.

EXAMPLE 3

*Sodium bis(N-butyl) sulphosuccinamide*

8.5 parts of bis(N-butyl) fumaramide, 39 parts of denatured alcohol, 2.8 parts of sodium bisulphite, and 50 parts of water were heated 48 hours at 105° C. in a nickel shaker bomb. The product was recovered by evaporating the solvent. The yellow solid dissolved in water to form foaming solutions which wet sulfur.

EXAMPLE 4

*Sodium bis(N-2-ethylhexyl) sulphosuccinamide*

3.4 parts of bis(N-2-ethylhexyl) fumaramide, 39 parts of denatured alcohol, 1.2 parts of sodium bisulphite, and 50 parts of water were heated in a Monel metal shaker bomb for 24 hours at 100–105° C. The product was a clear solution after filtering off a small amount of insoluble crystalline material. The product was recovered as a yellow-colored solid by evaporating the solvents. The product formed clear solutions in water which wet cotton textiles.

EXAMPLE 5

*Sodium bis(N-isoamyl) sulfosuccinamide*

9.85 parts of bis(N-isoamyl) fumaramide, 39 parts of denatured alcohol, 2.8 parts of sodium bisulphite, and 50 parts of water were heated in a Monel metal shaker bomb at 105° C. for 64 hours. The resulting clear yellow solution was evaporated on a hot plate and finally dried over phosphorus pentoxide in a vacuum dessicator. 13.5 parts of a soft solid was obtained which dissolved in water to give slightly cloudy foaming solutions which wet sulphur.

Example 6

Sodium bis(N-methyl,N-heptyl) sulphosuccinamide 8.45 parts of bis(N-methyl,N-heptyl) fumaramide, 39 parts of denatured ethyl alcohol, 2.8 parts of sodium bisulphite, and 50 parts of water were heated in a rotating nickel bomb for 40 hours at 100° C. 11.6 parts of a white solid was recovered by evaporating the solvents. The product was completely soluble in water, and its aqueous solutions wet sulphur.

Example 7

Sodium bis(N-methyl,N-1,3-dimethyl-butyl) sulphosuccinamide 7.75 parts of bis(N-methyl,N-1,3-dimethyl-butyl) fumaramide, 39 parts of denatured ethyl alcohol, 2.8 parts of sodium bisulphite, and 50 parts of water were heated in a rotating Monel metal bomb 40 hours at 100° C. The clear solution of the product was evaporated on the steam bath, and, after drying over phosphorus pentoxide with vacuum, 10.6 parts of solubilized amide was obtained.

Example 8

Sodium bis(N-methyl,N-decyl) sulphosuccinamide 10.6 parts of bis(N-methyl,N-decyl) fumaramide, 39 parts of denatured ethyl alcohol, 2.8 parts of sodium bisulphite, and 50 parts of water were heated in a rotating nickel bomb 24 hours at 105° C. The product was dissolved in water and extracted with ethyl ether. The ether solution was dried over sodium sulphate, filtered, and evaporated. The product was finally dried over phosphorus pentoxide at 5 mm. vacuum. 12.2 parts of a light brown gummy product was obtained which analyzed 5.9% sulphur indicating a purity of 97%. Aqueous solutions of this material promoted the wetting of cotton textiles.

Example 9

Sodium bis(N-methyl,N-2-ethylhexyl) sulphatosuccinamide 19.7 parts of bis(N-methyl,N-2-ethylhexyl) malic amide was dissolved in 29 parts of anhydrous ethyl ether and treated with a solution of 6.4 parts of chlorosulphonic acid dissolved in 29 parts of anhydrous ethyl ether. The acid was added at 0° C., and the solution left stand for several days at the end of which time it was drowned in water and neutralized with a dilute sodium hydroxide solution. The neutral solution foamed and displayed surface active properties. The probable formula of this new compound is:

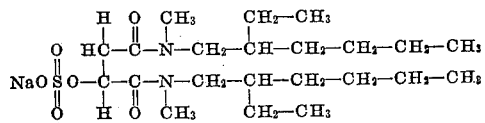

Example 10

Sodium bis(N-2-ethylhexyl) sulphatosuccinamide

Bis(N-2-ethylhexyl) malic amide which is prepared by treating diethyl malate with 2-ethylhexylamine is converted to the sulphated amide in the same manner as described in Example 9.

Diamides of aliphatic sulpho-dicarboxylic acids, such as those disclosed in Examples 1 to 8, are preferably prepared from diamides of fumaric and maleic acids. Diamides of other unsaturated aliphatic dicarboxylic acids may also be used as starting materials such as diamides derived from monobromofumaric acid, glutaconic acid, itaconic acid, gamma ethyl itaconic acid, muconic acid, etc.

Diamides of aliphatic sulphato-dicarboxylic acids, similar to those disclosed in Examples 9 and 10, may also be prepared from the diamides of unsaturated aliphatic dicarboxylic acids, such as those mentioned in the preceding paragraph. Generally, it is preferred to make diamides of aliphatic sulphato-dicarboxylic acids from diamides of hydroxy substituted dicarboxylic acids, such as diamides derived from tartronic acid, malic acid, alpha hydroxy glutaric acid, alpha hydroxy sebacic acid, mucic acid, tartaric acid, etc. Diamides derived from malic acid are highly preferred intermediates for use in the manufacture of the sulphated diamides comprehended by the present invention.

The intermediate diamides used for preparing the products of the present invention may be derived from any of the aliphatic dicarbocyclic acids mentioned in the two preceding paragraphs and any primary or secondary open chain aliphatic amine which contains from 4 to 11 carbon atoms. For instance, the intermediate diamides may be derived from such primary aliphatic amines as the straight chain and branched chain butyl, amyl, hexyl, heptyl, octyl, nonyl, decyl, and undecyl amines, or from straight chain and branched chain secondary amines such as diethylamine, dibutylamine, N-methyl N-isobutylamine, N-ethyl N-hexylamine, N-methyl N-heptylamine, N-isopropyl N-octylamine, N-methyl N-decylamine, etc. The intermediate diamides may be derived from mixtures of aliphatic primary and/or secondary amines having from 4 to 11 carbon atoms instead of being derived from an individual amine. Preferred intermediate diamides are derived from the branched chain primary amines such as 2-ethylhexylamine and the branched chain secondary amines such as N-methyl N-2-ethylhexylamine. Intermediate diamides which are derived from secondary amines which have at least 6 carbon atoms in a straight chain, as for example, N-methyl N-2-ethylhexylamine, are especially preferred since good wetting agents may be prepared therefrom.

The intermediate diamides may be prepared from any of the dicarboxylic acids and any of the aliphatic amines mentioned in the three preceding paragraphs by any appropriate method. For instance, these intermediate diamides may be made from the aforesaid acids and amines by the process which is described in U. S. Patent No. 1,986,854. As may be seen from Example 10, it is feasible to use the lower alkyl esters of these aliphatic dicarboxylic acids in preparing the intermediate diamides used in this invention. One may also employ the halides or anhydrides of these aliphatic dicarboxylic acids in preparing these intermediate diamides. The use of a halide of an aliphatic dicarboxylic acid in preparing these intermediate diamides may be illustrated by describing the preparation of bis(N-methyl,N-2-ethylhexyl) fumaramide, the intermediate diamide which is employed in Example 1.

A benzene solution of fumaroyl chloride is added to a benzene-water slurry containing sodium hydroxide and N-methyl, N-2-ethylhexylamine. This mixture is stirred for several hours while maintaining its temperature at about 30° C. The benzene layer is then separated, the benzene evaporated, and the brown oil distilled. A high yield of oil boiling at about 250° C. at 2 mm. is obtained.

In general, we have used symmetrical amides made by reacting a single amine with both carboxyl groups of the aliphatic dicarboxylic acid. It is feasible, however, to use a mixture of amines for formation of the diamides of dicarboxylic acids, or we may react one mole of an amine with one mole of the dicarboxylic acid to form the half amide and then subsequently react the half amide with another amine to form an unsymmetrical diamide.

For the preparation of sulphonic acid derivatives, we prefer to use an alkali acid sulphite for reaction with the unsaturated diamides. Best results are obtained when we use unsaturated diamides in which the unsaturated linkage is conjugated with the carbonyl of the amide group. While we have usually employed sodium acid sulphite, we may also use potassium acid sulphite, ammonium acid sulphite, or some other metal acid sulphite. As a solvent for this reaction we may use water, alcohols, mixtures of water with alcohols, or other suitable solvents. The formation of sulphonic acid salts proceeds slowly at ordinary temperatures, and we have obtained best results by operating above 100° C. and in a closed system when using mixtures of alcohol and water as the solvent. Certain unsaturated amides react sluggishly even under these conditions, and we have found it necessary in these cases to operate at 150° C. in a closed system in order to speed up the reaction. Another method of producing sulphonic acid derivatives consists in treating an unsaturated amide such as bis(2-ethylhexyl) fumaramide with sulphuric acid monohydrate or fuming sulphuric acid at elevated temperatures, such as above 100° C.

In general, we prefer to prepare the sulphonic acid derivatives rather than the sulphuric acid derivatives because of the greater stability of the sulphonic acid derivatives in the presence of strong acids or of high temperatures.

For the preparation of sulphuric acid derivatives, we prefer to carry out the sulphation of the diamides of hydroxy dicarboxylic acids with chlorosulphonic acid in a way such as is described in Example 9. Other means of sulphation may be employed, however. For example, bis(2-ethylhexyl) fumaramide may be treated with sulphuric acid monohydrate at 0 to +5° C., and then allowed to stand at room temperature for some time. When using chlorosulphonic acid or sulphuric acid monohydrate, we may employ solvents such as ethyl ether, carbon tetrachloride, symmetrical dichloroethyl ether, trichloroethylene, acetic anhydride, etc.

We may also prepare the sulpho- or sulphatoamides of this invention by reaction; e. g., of sulphosuccinic acid or sulphato-succinic acid with a suitable amine in which case we obtain the amine salt of the bis-sulpho- or bis-sulphatosuccinamide. We have also prepared sulphosuccinic esters, for example, by reaction of dimethyl fumarate with sodium acid sulphite. We may then react dimethyl sodium sulphosuccinate with a suitable amine to obtain the sodium sulphosuccinamide.

By the expression "amides of sulphodicarboxylic acids and sulphatodicarboxylic acids", we mean to include not only the free acids in which the sulphate group or the sulphonate group is attached to a carbon atom on the acid residue but also their salts as, for example, sodium, potassium, ammonium, calcium, magnesium, aniline, cyclohexylamine, ethylamine, isobutylamine, dimethylamine, glucamine, dodecylamine, pyridine, ethanolamine, etc. The alkali metal salts, such as the sodium salts, constitute the preferred form of these sulphonates and sulphates.

The new compositions covered in this case belong to the class of surface active or capillary active materials in that they have colloidal properties and may, therefore, be advantageously used in any process involving wetting, penetrating, deterging, dispersing, emulsifying, frothing, foaming, and kindred phenomena. These compositions may be employed in pure or standardized form, and if desired, in conjunction with known processing or treating agents. They may be used by themselves or in combination with other surface active agents in any relation in which surface active agents having colloidal properties have heretofore been used.

Many uses of these new compositions are connected with treatments for processing and improving natural and synthetic textile materials. A few representative uses of these new products as textile assistants will be mentioned in order that the importance and widespread applicability of these new products in the textile industries may be fully appreciated. They may be used alone or in combination with suitable detergents for cleansing and scouring vegetable and animal fibers when removing fatty or oily materials. When added to flax retting baths, they function as wetting and penetrating agents. They may be employed as assistants in fulling and felting processes. They may be used in sizing preparations in combination with the usual materials such as starches or gelatine or their equivalents, clays, talcs, weighing salts such as magnesium sulphate or calcium chloride, oils and oils processed by oxidization, polymerization, sulphonation, etc. The penetrating power of these new compositions is utilized with advantage when they are added to baths containing starch ferments which are employed for removing sizing from textile materials. These products function as useful wetting, cleansing, and penetrating agents in bleaching liquors such as those used in the kier boiling of cotton goods. They may be added to the lye liquors used for mercerizing cotton goods. They improve the absorption capability of fibrous materials when such materials are subjected to treatments for finishing, softening, stiffening, coloring, impregnating, water-proofing, and mildew-proofing. They may be used alone or in combination with other materials for lustering or delustering fabrics. They may be employed to oil or lubricate textile materials and as assistants in processes of weighting or loading fabrics. They may be used as assistants in silk degumming liquors and silk soaking solutions.

Another important class of uses of these new compositions is as assistants in the preparation and application of dyestuffs. They may be used in the preparation of dyestuffs in readily dispersible form and for the production of inorganic pigments or pigments of azo, basic, acid, vat, and sulphur dyes in a finely divided condition. As penetrants and wetting agents, they assist in producing level dyeings in neutral, acid or alkaline dyeing baths. They facilitate dyeing with developed dyes, the dyeing of animal fibers with vat dyes, the dyeing of cellulose acetate fibers with insoluble dyes, dyeing and printing with aniline black, and the dyeing of leather. In printing pastes they assist in the dispersion of the dye or dye component and facilitate its penetration into the natural or synthetic fiber.

In the leather industry, these compositions function as useful wetting agents in soaking, deliming, bating, tanning, and dyeing baths. They are useful in softening and treating baths for hides and skins, particularly in baths used for fat-liquoring leather. Solutions of these compounds are useful for pretreating leather prior to dyeing.

The dispersing and emulsifying powers of these new compositions give rise to many interesting uses. They may be utilized for converting liquid or solid substances normally insoluble in water, such as hydrocarbons, higher alcohols, pitches, and pitchy substances into clear solutions or stable emulsions or dispersions. They are useful in preparing emulsions of wax and wax-like compositions which are used as leather dressings or floor polishes. They may be used to prepare artificial dispersions of crude, vulcanized, or reclaimed rubber. They may be used as emulsifiers in the manufacture of cosmetic preparations such as cold creams and lip sticks. They may be employed for preparing emulsions of the water-in-oil type such as emulsions of water in such organic solvents as are used in the dry cleaning industry.

These compositions may be used for enhancing the spreading and penetrating power of parasiticides. They may be employed in agricultural sprays in combination with the ordinary insecticides and fungicides. They are useful for promoting the penetrating power of wood preservatives.

In the paper industry, these products may be used as penetrants in the liquors used for cooking rags and pulp, and as assistants in paper softening, filling, and processes to increase absorbency.

These compositions may be employed as detergents in several different relations. They may be used in the washing of fruits and vegetables for spray residue removal. They may be used in combination with metal cleaning compounds in neutral, acid, or alkaline liquors. They may be used for paint, varnish, and lacquer cleaners. They may advantageously be employed as cleansing agents in hard water and where a fatty or oily film resists the ordinary cleansing media. They may be added to soap in hard water baths, since these compositions do not form precipitates so readily in hard waters as soaps and Turkey red oils.

These compositions may be used as aids in various chemical reactions. They may be used to control particle size and shape during precipitation or crystallization of compounds from reaction mixtures. They may be used to decrease the particle size of insoluble amine hydrochlorides just before these amines are to be diazotized.

These compositions also have several miscellaneous uses. They may be employed as foam stabilizing agents, especially for use in air-foam fire extinguishing compositions. They may be used to stabilize rubber latex. They may also be used as frothing and collecting agents in ore flotation processes, and in other processes such as the recovery of fixed oil from the oil sands. These compounds may be used in tooth paste and in non-spattering margarins.

These compounds may be employed as emulsifying agents for the preparation of latices containing polymerized dienes. In view of their capillary active properties, they find use in the emulsion polymerization of polymerizable compounds, such as chloroprene, which are capable of yielding rubber-like materials, such as "Neoprene."

The above description and examples are intended to be illustrative only and not to limit the scope of the invention. Any departure therefrom which conforms to the spirit of the invention is intended to be included within the scope of the appended claims.

We claim:

1. Diamides selected from the class consisting of diamides of aliphatic sulpho- and sulphato-dicarboxylic acids in which each amide group is derived from an open chain aliphatic amine containing from 4 to 11 carbon atoms.

2. N,N'-alkyl substituted diamides selected from the class consisting of diamides of aliphatic sulpho- and sulphato-dicarboxylic acids in which each alkyl substituted amide group contains from 4 to 11 carbon atoms.

3. Surface active amides having the general formula: $X-R(CONR'R'')_2$ in which X represents a group selected from the class consisting of sulphonate and sulphate groups, R stands for an aliphatic radical, R' denotes a member of the class consisting of hydrogen and short chain aliphatic radicals, and R'' is an open chain aliphatic radical, the sum of the number of carbon atoms in R' and R'' being at least 4 and not more than 11.

4. N,N'-alkyl substituted diamides selected from the class consisting of diamides of sulpho- and sulphato-succinic acids in which each alkyl substituted amide group contains from 4 to 11 carbon atoms.

5. N,N'-alkyl substituted diamides selected from the class consisting of diamides of sulpho- and sulphato-succinic acids in which each alkyl substituted amide group is derived from a branched open chain aliphatic amine containing from 8 to 9 carbon atoms.

6. N,N'-2-ethylhexyl substituted diamides selected from the class consisting of diamides of sulpho- and sulphato-succinic acids in which each 2-ethylhexyl substituted amide group is derived from an amine selected from the class consisting of 2-ethylhexylamine and N-methyl N-2-ethylhexylamine.

7. Sodium bis(N-methyl,N-2-ethylhexyl) sulphosuccinamide.

8. A process for preparing sodium bis(N-methyl,N-2-ethylhexyl) sulphosuccinamide which comprises reacting sodium acid sulphite with bis(N-methyl,N-2-ethylhexyl) fumaramide.

9. Sodium bis(N-methyl,N-2-ethylhexyl) sulphatosuccinamide.

10. A process for preparing sodium bis(N-methyl,N-2-ethylhexyl) sulphatosuccinamide which comprises sulphating bis(N-methyl,N-2-ethylhexyl) malic amide with chlorosulphonic acid in an anhydrous ethyl ether solution, and neutralizing the sulphated amide with an aqueous solution of sodium hydroxide.

11. Sodium bis(N-methyl,N-heptyl) sulphosuccinamide.

WILLIAM EDWARD HANFORD.
CLYDE OVERBECK HENKE.